US008893969B2

(12) United States Patent
Brandl

(10) Patent No.: US 8,893,969 B2
(45) Date of Patent: Nov. 25, 2014

(54) SESSION FLAG CONTROL FOR RFID TAGS

(75) Inventor: Roland Brandl, Eggersdorf bei Graz (AT)

(73) Assignee: NXP B.V., Eindhoven (NL)

( * ) Notice: Subject to any disclaimer, the term of this patent is extended or adjusted under 35 U.S.C. 154(b) by 14 days.

(21) Appl. No.: 13/601,899

(22) Filed: Aug. 31, 2012

(65) Prior Publication Data

US 2014/0061303 A1    Mar. 6, 2014

(51) Int. Cl.
G06F 19/00 (2011.01)
G06K 5/00 (2006.01)

(52) U.S. Cl.
USPC ......................................... 235/385; 235/380

(58) Field of Classification Search
CPC ............ G06K 7/0008; G06K 19/0701; G06K 19/0723; G06K 7/10009; G06K 7/10029; G06K 7/10039; G06K 7/10128; G06K 7/10356; H04Q 2209/47; H04Q 2209/75; H04Q 2209/88; H04Q 9/00; G06Q 10/087; G08B 13/2462; H04L 63/04; H04L 63/083
USPC ..................... 235/385, 380, 382, 492; 340/10
See application file for complete search history.

(56) References Cited

U.S. PATENT DOCUMENTS 5,598,032 A * 1/1997 Fidalgo .......................... 257/679
8,400,268 B1 * 3/2013 Malik et al. ..................... 340/8.1

2008/0048857 A1   2/2008 Billmaier et al.
2010/0060425 A1 * 3/2010 Rodriguez et al. ............ 340/10.1
2012/0040610 A1 * 2/2012 Moosavi et al. ............... 455/41.1
2012/0040611 A1 * 2/2012 Griffin et al. .................. 455/41.1
2012/0191817 A1 * 7/2012 Sayan ............................ 709/219
2012/0242481 A1 * 9/2012 Gernandt et al. ......... 340/539.13

FOREIGN PATENT DOCUMENTS

EP         2 420 958 A2    2/2012

OTHER PUBLICATIONS

Extended European Search Report for Patent Appln. No. 13182065.6 (Dec. 9, 2013).
EPC Radio-Frequency Identity Protocols Class-1 Generation-2 UHF RFID Protocol for Communications at 860 MHz—960 MHz, Version 1.2.0, printed Oct. 23, 2008.

* cited by examiner

Primary Examiner — Thien M Le

(57) ABSTRACT

Various exemplary embodiments relate to an integrated circuit (IC) including: an inventoried flag configured to indicate whether the integrated circuit has been inventoried in a current inventory round; and an event detector configured to detect a tag event at the integrated circuit and reset the inventoried flag based on the tag event. In various embodiments, the IC further includes a timer circuit configured to measure a predetermined time since the inventoried flag was set and to prevent the reset of the inventoried flag until the predetermined time has expired.

20 Claims, 5 Drawing Sheets

SESSION FLAG CONTROL FOR RFID TAGS

TECHNICAL FIELD

Various exemplary embodiments disclosed herein relate generally to radio frequency identification (RFID).

BACKGROUND

RFID tags provide a convenient means for identifying physical objects. An RFID tag can be placed on or incorporated into an object. An RFID reader can wirelessly read multiple RFID tags within range of the reader. Passive RFID tags may not include a power source, instead drawing power from the radio signal of the RFID reader. Given these properties, RFID tags can be used for inventory management. An RFID reader may periodically poll RFID tags within its field to determine which physical objects are present.

SUMMARY

A brief summary of various exemplary embodiments is presented. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various exemplary embodiments relate to an integrated circuit (IC) including: an inventoried flag configured to indicate whether the integrated circuit has been inventoried in a current inventory round; a timer circuit configured to determine the time since the inventoried flag was set; and an event detector configured to detect a tag event at the integrated circuit and reset the inventoried flag if the timer circuit indicates that a predetermined time has passed since the inventoried flag was set.

In various embodiments, the event detector is a motion detector configured to detect movement of the IC.

In various embodiments, the event detector is a switch configured to detect a physical contact.

In various embodiments, the event detector is a temperature sensor configured to detect a change in temperature.

Various embodiments further include a wired interface configured to receive an indication of an event from an external device, wherein the event detector is configured to reset the inventoried flag based on the received indication.

Various embodiments further include a memory, wherein the event detector is configured to store data in the memory based on the detected tag event.

In various embodiments, the IC is an NFC Forum tag.

Various exemplary embodiments relate to an inventory system including the above described IC and an RFID reader configured to query the inventoried flag of the tag and determine whether a tag event has occurred at the tag.

In various embodiments, the RFID reader is further configured to conduct a first inventory round of any tag having an inventory flag in a first state and conduct a consecutive inventory round of any tag having the inventory flag in the first state.

In various embodiments, the RFID reader is configured to determine that a tag event has occurred at the tag when the tag responds to the first inventory round and the second inventory round.

Various embodiments relate to a method performed by a radio frequency identification (RFID) tag. The method includes: setting an inventoried flag to indicate that the RFID tag has been inventoried in a current inventory round; detecting a tag event at the RFID tag; determining whether a pre-determined time has elapsed since setting the inventoried flag; if the pre-determined time has not elapsed, waiting until the pre-determined time has elapsed; and resetting the inventoried flag to indicate that the RFID tag has not been inventoried in the current inventory round.

In various embodiments, the method further includes storing information about the tag event; and transmitting the information to a tag reader when the RFID tag is next inventoried.

In various embodiments, the tag event is a change in a measured temperature.

In various embodiments, the tag event is movement of the tag.

In various embodiments, the tag event is a physical actuation of a switch.

In various embodiments, the tag event is an external event detected via a wired interface with an external device.

Various embodiments relate to a method performed by a radio frequency identification (RFID) reader. The method includes: conducting a first inventory round of RFID tags within a field of the RFID reader that have an inventoried flag set to a first value; changing the inventoried flag of tags that respond to a second value; storing an identifier of each RFID tag that responds to the first inventory round; conducting a second inventory round of RFID tags within the field of the RFID reader that have an inventoried flag set to the first value; determining whether an identifier of a tag that responds to the second inventory round was stored for the first inventory round; and if the identifier of a tag that responds to the second inventory round was stored, determining that a tag event has occurred at the RFID tag.

In various embodiments, the method further includes receiving information regarding the tag event from the RFID tag.

In various embodiments, the first inventory round and the second inventory round are consecutive.

In various embodiments, the method further includes: storing the identifier of a tag that responds to the second inventory round if the identifier was not stored.

It should be apparent that, in this manner, various exemplary embodiments enable detecting tag events at an RFID tag. In particular, by having a tag reset an inventoried flag when a tag event occurs, a tag reader can determine a tag that experienced a tag event.

BRIEF DESCRIPTION OF THE DRAWINGS

In order to better understand various exemplary embodiments, reference is made to the accompanying drawings, wherein.

DETAILED DESCRIPTION

Figure 1:
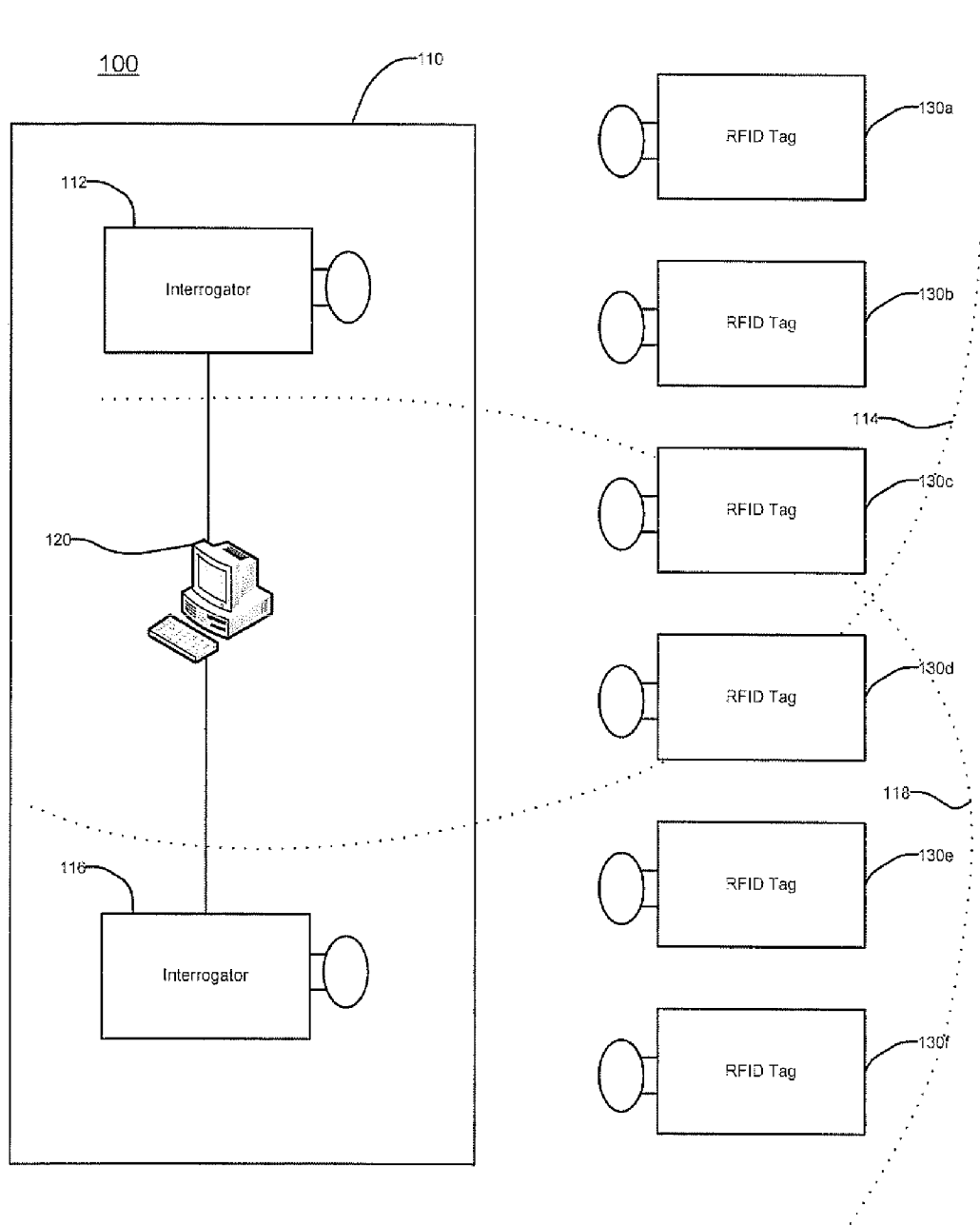
FIG. 1 illustrates an exemplary environment using RFID.

RFID tags and readers may follow a protocol to manage multiple tags. For example, EPCglobal, Inc. publishes a specification: EPC Radio-Frequency Identity Protocols Class-1 Generation-2 UHF RFID Protocol for Communications at 860 MHz-960 MHz, Version 1.2.0. This specification defines various RFID protocols and is hereby incorporated by reference. Other protocols defining RFID communications may also be used. Referring now to the drawings, in which like numerals refer to like components or steps, there are disclosed broad aspects of various exemplary embodiments.

FIG. 1 illustrates an exemplary environment 100 using RFID. Environment 100 may include any environment where at least one RFID reader 110 communicates with at least one RFID tag 130. For example, environment 100 may include warehouses, stores, or any other location where physical items are tracked with RFID tags. Environment 100 may include an RFID reader 110 and one or more RFID tags 130.

RFID reader 110 may be a device or network of devices configured to interrogate RFID tags. RFID reader 110 may include one or more RFID interrogators 112, 116, and a central coordinator 120.

RFID interrogator 112 may be a device configured to read RFID tags. RFID interrogator 112 may include an RF transmitter that transmits a modulated RF carrier and an unmodulated RF carrier. RFID interrogator 112 may also include an RF receiver configured for receiving a backscattered RF carrier from a tag. RF interrogator 112 may generate an RF field 114.

RF field 114 may indicate the communications range of RF interrogator 112. The RF field 114 may extend across a space where an RF Tag within the field 114 is able to backscatter the RF carrier such that the RFID interrogator 112 is able to receive the backscattered signal. Accordingly, RF field 114 may vary based on the strength of the RF carriers and the characteristics of the physical environment.

RF interrogator 116 may be similar to RF interrogator 112. RF interrogator 116 may be located in a different space and generate its own RF field 118. Accordingly, a second RF interrogator 116 may be used to extend the range of RF interrogator 112. Additional RF interrogators (not shown) may be used to extend the RF field to all areas of the environment 100 that are monitored.

Central coordinator 120 may be a server or other computing device including a processor configured to manage one or more RF interrogators. Central coordinator 120 may send and receive information from RF interrogators. Central coordinator 120 may provide a user interface for an operator to view RFID information. Central coordinator 120 may include software for managing the RFID information.

Figure 2:
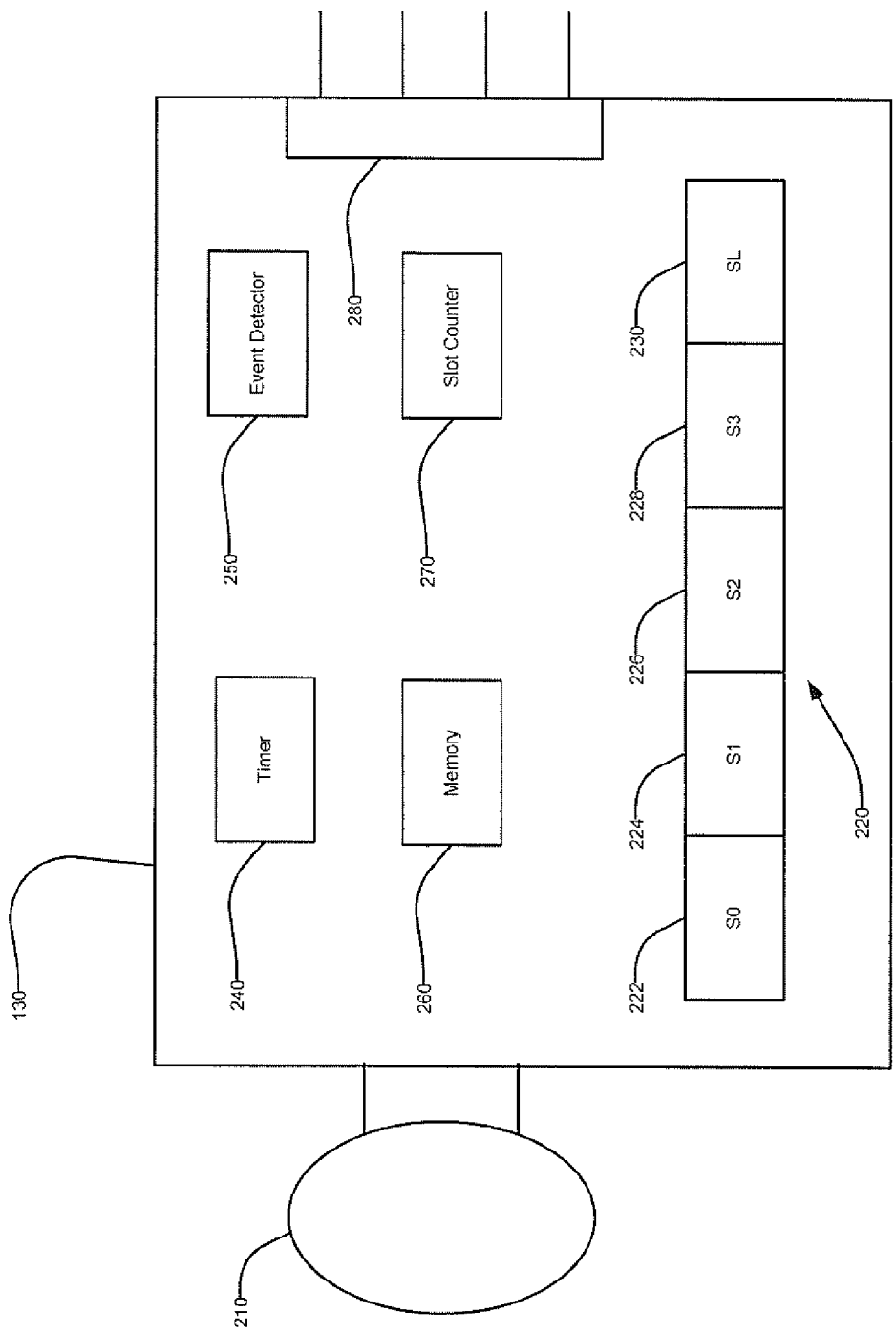
FIG. 2 illustrates an exemplary RFID tag.

FIG. 2 illustrates an exemplary RFID tag 130. RFID tag 130 may be an RFID tag attached to a physical object. RFID tag 130 may include RF antenna 210, inventoried flags 220, timers 240, event detector 250, memory 260, slot counter 270, and wired interface 280.

RF antenna 210 may be an antenna configured to receive RF signals broadcast by RF reader 110. The RF signals received by RF antenna 210 may provide power to RFID tag 130. RE antenna 210 may also broadcast a backscattered signal, which may be read by RF reader 110.

Inventoried flags 220 may indicate the status of tag 130 in various inventory sessions with one or more RF readers. Each inventoried flag 220 may indicate one of two states. The states may be referred to as state A and state B. Alternatively, the inventoried flags 220 may be described as having a value of 0 or a value of 1. In various embodiments, RFID tag 130 includes five inventoried flags. Four of the inventoried flags may relate to different inventory sessions. Communications between RF reader 110 and RF tags 130 may occur within an inventory session. Each inventoried flag may have a predetermined minimum persistence time during which the tag may maintain the flag value even if the tag is unpowered. If the tag remains in an unpowered state for longer than the predetermined minimum persistence time, an inventoried flag 220 may reset to a default state. In various embodiments, an inventoried flag 220 may maintain its value for a longer period than the predetermined minimum persistence time based on factors such as temperature. In various embodiments where tags are frequently energized, an inventoried flag 220 may maintain its value indefinitely.

Inventoried flag 222 may be an S0 inventoried flag indicating a status of an S0 session. The S0 inventoried flag may have no predetermined persistence time and automatically reset to state A whenever tag 130 is unpowered.

Inventoried flag 224 may be an S1 inventoried flag indicating a status of an S1 session. The S1 inventoried flag may have a predetermined minimum persistence time of 500 ms and a predetermined maximum persistence time of 5000 ms. The persistence time of inventoried flag 224 may be measured from the time the flag is set.

Inventoried flag 226 may be an S2 inventoried flag indicating a status of an S2 session. The S2 inventoried flag may have a predetermined minimum persistence time of 2000 ms. The persistence time of inventoried flag 226 may be measured from the time RFID tag 130 loses power. The S2 inventoried flag may reset to state A when the persistence time has expired.

Inventoried flag 228 may be an S3 inventoried flag indicating a status of an S3 session. The S3 inventoried flag may have a predetermined minimum persistence time of 2000 ms. The persistence time of inventoried flag 228 may be measured from the time RFID tag 130 loses power. The S3 inventoried flag may reset to state A when the persistence time has expired.

Inventoried flag 230 may be a selected flag that is not related to a specific session. The SL inventoried flag may have a predetermined minimum persistence time of 2000 ms. The persistence time of inventoried flag 230 may be measured from the time RFID tag 130 loses power. The SL inventoried flag may reset to state A when the persistence time has expired.

RFID tag 130 may include one or more timers 240. A timer 240 may include one or more circuits configured to measure a fixed time when started. For example, a timer 240 may measure the time since a flag was set. Timers 240 may indicate that one or more inventoried flags are within a predetermined minimum persistence time, and therefore should not be reset. In various embodiments, timers 240 may include a circuit configured to have a set persistence. Accordingly, a timer 240 may be set at the same time as one of inventoried flags 220. The timer 240 may assert a value of 1 until the fixed time for the inventoried flag 220 expires, then revert to a value of 0. Therefore, timers 240 may be read to determine whether an inventoried flag 220 has met a predetermined minimum persistence requirement.

Event detector 250 may include any circuit capable of resetting an inventoried flag 220 upon detecting a tag event at RFID tag 130. A tag event may be an external event at the location of the tag that is detected by the tag. A tag event may cause an inventoried flag to be reset prematurely. Accordingly, a tag resetting due to expiration of a persistence time may not be considered a tag event. Event detector 250 may check timer 240 to determine whether a predetermined minimum persistence of the inventoried flag 220 has expired. If an event has been detected and timer 240 has expired, one or more inventoried flags may be reset to indicate that the RFID tag 230 has not been inventoried.

In various embodiments, event detector 250 may be a motion detector. The motion detector may detect movement of the RFID tag 130 and generate a tag event. For example, event detector 250 may detect motion by measuring the field strength of RF field 114. As RFID tag 130 is moved within RF field 114, the field strength may increase or decrease. Event detector 250 may be configured to measure the field strength and generate a tag event if the field strength changes.

In various embodiments, event detector 250 may be a physical switch. RFID tag 130 may include a button, lever, or other manually activated switch. A person with physical access to the RFID tag 130, such as a warehouse attendant or retail clerk, may activate the physical switch to generate a tag event.

In various embodiments, event detector 150 may be a temperature sensor. The temperature sensor may continuously monitor the temperature of the RFID tag 130 or the surrounding environment. The temperature sensor may be configured to generate a tag event when the measured temperature crosses a threshold. For example, an RFID tag 130 used to monitor a frozen product may generate a tag event if a measured temperature exceeds a freezing point.

In various embodiments, event detector 250 may be connected to a wired interface 280. Event detector 250 may receive communications via wired interface 280 and determine that a tag event has occurred. Accordingly, event detector 250 may detect tag events from any device that may be connected to RFID tag 130 via wired interface 250.

Memory 260 may include both volatile and non-volatile memory. In various exemplary embodiments, memory 260 includes a non-volatile electronically erasable programmable read only memory (EEPROM). Accordingly, memory 260 may store data when tag 130 loses power. Memory 260 may store information related to a tag event. For example, memory 260 may store a flag indicating that a tag event has occurred. The flag may be set by event detector 250. By reading the flag from the RFID tag 130, RFID reader 110 may be able to determine that a tag event has occurred as opposed to a persistence timeout of the inventoried flag 220. Memory 260 may store additional information regarding the tag event if available. For example, a temperature sensor may store the current temperature in memory 260. As another example, any data received via wired interface 280 may be stored in memory 260.

Slot counter 270 may be used to perform anticollision among multiple RFID tags 130. Tag 130 may generate a random number for slot counter 270 when initially inventoried by an RFID reader 110. Upon receipt of additional signals from RFID reader 110, tag 130 may then decrement slot counter 270 until the slot counter reaches 0. Tag 130 may then backscatter the RF signal to transmit information to RFID reader 110.

Wired interface 280 may include one or more pins connecting tag 130 to an external device (not shown). In various exemplary embodiments, wired interface 280 may be an inter-integrated circuit (I²C) interface. Wired interface 280 may include a VCC pin to supply power, a SCL pin to provide a clock signal, an SDA pin to carry data and addresses, and a FD pin to indicate whether an RF field is detected. Any other wired interface for communicating data may also be used. Wired interface 280 may be assigned a slave address for tag 130. Wired interface 280 may be used to read and/or write data to memory 260.

Figure 3:
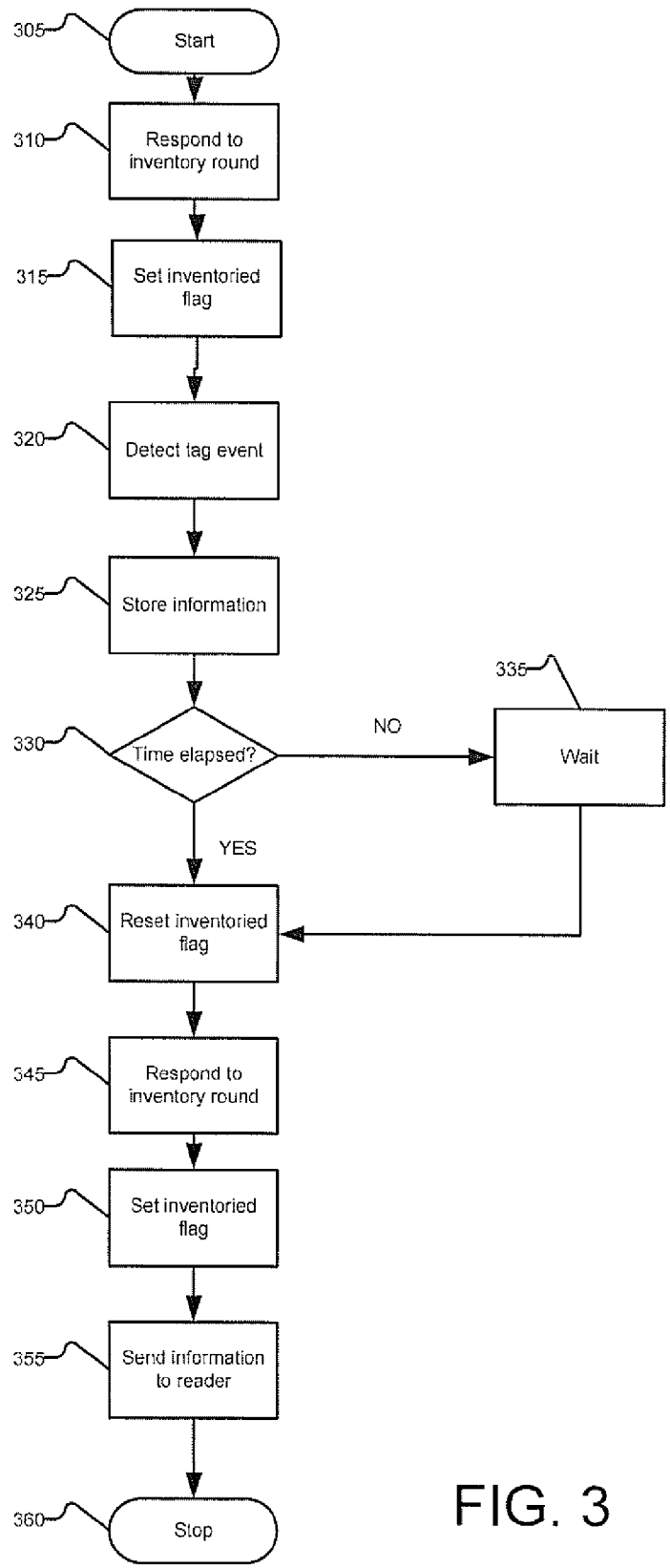
FIG. 3 illustrates a flowchart showing an exemplary method performed by an RFID tag.

FIG. 3 illustrates a flowchart showing an exemplary method 300 performed by an RFID tag 130. Method 300 may be performed following an inventory round initiated by an RFID reader 110. Method 300 may begin at step 305 and proceed to step 310.

In step 310, RFID tag 130 may respond to an inventory round initiated by an RFID reader 110. In various embodiments, RFID reader 110 may repeatedly initiate inventory rounds of RFID tags 130 having a inventoried flag having a first value using a query command. For example, RFID reader 110 may inventory all RFID tags having the S2 inventoried flag set to state A. If RFID tag 110 has the indicated inventoried flag set to the indicated state, RFID tag 110 may reply to the query command during an anticollision procedure of the inventory round. RFID tag 110 may also provide a unique identifier such as an electronic product code (EPC) within the inventory round. For example, RFID tag 110 may respond to an ACK command with the EPC or other unique identifier.

In step 315, RFID tag 130 may set an inventoried flag according to a command sent by an RFID reader 110. For example, if the RFID reader 110 inventoried tags having an inventoried flag set to the A state, RFID tag 130 may set the inventoried flag to the B state.

In step 320, RFID tag 130 may detect a tag event. As discussed above, the tag event may include any event detectable by an internal circuit or external device.

In step 325, RFID tag 130 may store information related to the tag event. For example, tag 130 may store an indication that the tag event has occurred. If RFID tag 130 includes multiple event detectors 250, RFID tag 130 may store an indication of which event detector generated the tag event. RFID tag 130 may also store any available information regarding the specific tag event. For example, RFID tag 130 may store a temperature reading from a event detector 250 or information received via wired interface 280.

In step 330, RFID tag 130 may determine whether a predetermined persistence time has elapsed. RFID tag 130 may check the status of a timer 260 corresponding to the inventory flag 220 to determine whether the minimum persistence time has elapsed. If the persistence time has not elapsed, the method 300 may proceed to step 335, where RFID tag 130 may wait for the minimum persistence time to elapse. If the persistence time has elapsed, the method 300 may proceed directly to step 340. In either case, once the minimum persistence time has elapsed, the method 300 may proceed to step 340.

In step 340, RFID tag 130 may reset the inventoried flag 220 to its previous state. In the example described above, RFID tag 130 may reset the S2 inventoried flag 226 to state A.

In step 345, RFID tag 130 may respond to a second inventory round initiated by RFID reader 110. The second inventory round may be similar to the first inventory round describe above regarding step 310. Although RFID reader 110 may query RFID tags having the same inventoried flag status as the first inventory round, RFID tag 130 may respond to both inventory rounds because the inventoried flag was reset. Accordingly, RFID tag 130 may again respond to the inventory round with the same unique identifier.

In step 350, RFID tag 130 may set the inventoried flag to the value indicated by the RFID reader.

In step 355, RFID tag 130 may respond to a request by the RFID reader 110 by providing stored information. RFID reader 110 may request to read any information in the memory of RFID tag 130. For example, RFID reader 110 may request to read user data including any information stored in step 320. Accordingly, RFID tag 130 may transmit the requested information. The method 300 may then proceed to step 360, where the method 300 ends.

Figure 4:
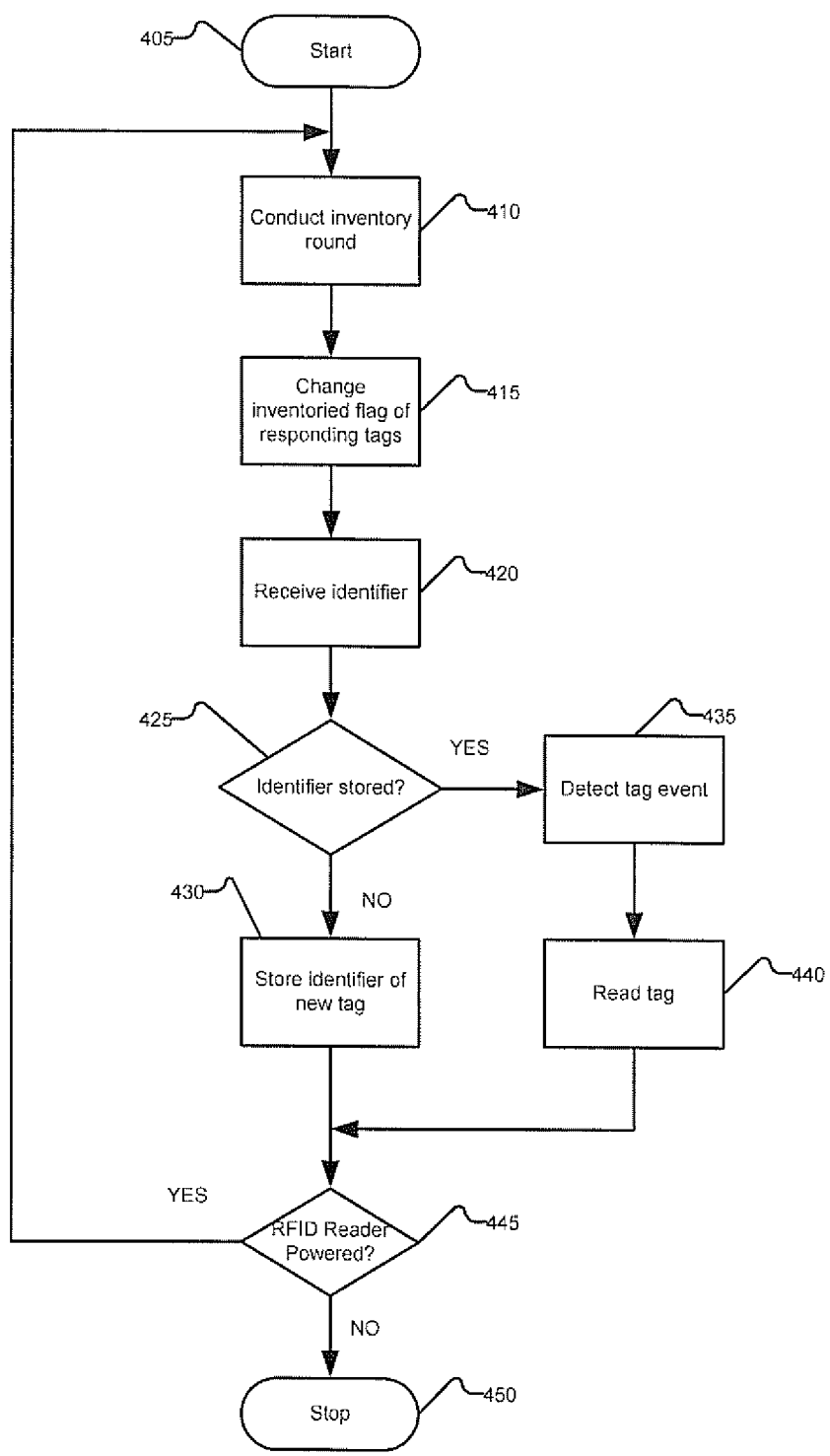
FIG. 4 illustrates a flowchart showing an exemplary method performed by an RFID reader.

FIG. 4 illustrates a flowchart showing an exemplary method 400 performed by an RFID reader 110. The method 400 may be performed in conjunction with an RFID tag 130 performing method 300. The method 400 may begin at step 405 and proceed to step 410.

In step 410, RFID reader 110 may conduct an inventory round using a query command. RFID reader 110 may query all RFID tags 130 having a particular inventoried flag set to a particular state. In various embodiments, RFID reader 110 may use one of S2 inventoried flag 226, S3 inventoried flag 228, and SL inventoried flag 230. These inventoried flags may be similar in that they each have a predetermined minimum persistence time of 2 seconds and reset to the A state upon a persistence timeout. By repeatedly querying tags having one of these inventoried flags in the A state, RFID reader 110 may inventory only those tags that have recently entered the RF field 114, those that have lost power for the maximum persistence time, and those that have experienced a tag event. Accordingly, RFID reader 110 may reduce the number of tags queried in each inventory round and decrease the duration of each inventory round. The method 400 may then proceed to step 415.

In step 415, RFID reader 110 may change the inventoried flag of each responding RFID tag 130. RFID reader 110 may use a QueryAdjust or QueryRep command to invert the inventoried flag of the responding RFID tag 130. In the embodiments where RFID reader 110 queries tags in the A state, RFID reader 110 may change the inventoried flag to the B state.

In step 420, RFID reader 110 may receive an identifier from the inventoried RFID tag 130.

In step 425, RFID reader 110 may determine whether the received identifier is stored in a list of identified tags. If the received identifier has previously been stored, the method 400 may proceed to step 435. If the received identifier has not been previously stored, the method 400 may proceed to step 430.

In step 430, the identifier may be stored at RFID reader 110 for future reference. Any data structure capable of storing a plurality of identifiers may be used.

In step 435, the RFID reader 110 may determine that a tag event has occurred at the inventoried tag 130 because this is the second time that the tag has responded to an inventory round.

In step 440, the RFID reader 110 may read information from the inventoried tag 130. RFID reader 110 may use a Read command to read memory 260 of the inventoried flag. RFID reader 110 may use the received information to determine whether an actual tag event has occurred at the RFID tag or whether the tag merely had a persistence timeout. RFID reader 110 may further process the tag event. For example, RFID reader 110 may generate an alert based on the detected tag event.

In step 445, the RFID reader 110 may determine whether to begin another inventory round. If the RFID reader 110 remains powered, RFID reader 110 may automatically return to step 410 and begin another inventory round to determine if there has been any changes to the RFID tags 130. If RFID reader 445 has powered down, for example, to allow another RFID reader to inventory the tags, the method 400 may proceed to step 450, where the method 400 ends.

Figure 5:
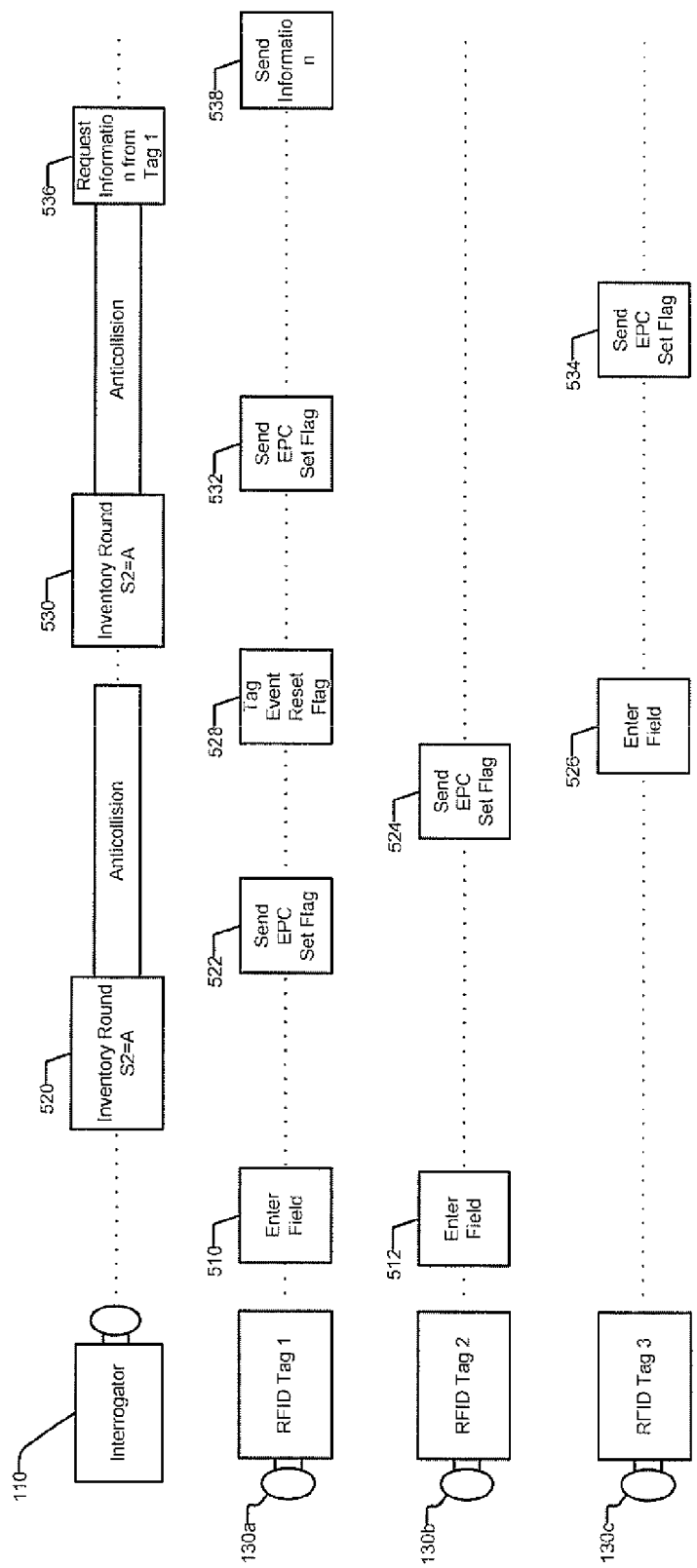
FIG. 5 illustrates a timeline showing interaction between an RFID reader and RFID tags.

FIG. 5 illustrates a timeline showing interaction between an RFID reader 110 and RFID tags 130a-c. Although three RFID tags are shown, it should be apparent that any number of RFID tags may interact with an RFID reader.

In step 510, RFID tag 130a may enter the RF field 114 of RFID reader 110. Likewise, in step 512, RFID tag 130b may enter the RF field 114 of RFID reader 110. The RFID tags and the objects to which they are attached may be physically moved into the RF field 114. Alternatively, RFID reader 110 may be powered-on and generate the RF field 114 for the first time. The RFID tags 130 that were not within the RF field 114 may have been unpowered. Accordingly, the RFID tags 130 may have experienced a persistence timeout and the inventoried flags 220 may have reverted to a default state. For example, S2 inventoried flag 226 may have reset to state A.

In step 520, RFID reader 110 may begin an inventory round. In particular, RFID reader 110 may query all RFID tags having a selected value for an inventoried flag 220. For example, RFID reader 110 may query all RFID tags having the S2 inventoried flag 226 set to state A. Every RFID tag 130 within the RF field 114 may be energized by the RF field 114 and receive the query command. Those tags whose inventoried flags match the query command may participate in the anticollision phase by generating a random number for slot counter 270.

Step 522 may occur when the slot counter for RFID tag 130a reaches a value of zero. RFID tag 130a may backscatter an RF carrier from RFID reader 110 to send a unique identifier such as an EPC. RFID reader 110 may receive and store the unique identifier. RFID tag 130a may also set the inventoried flag 226 as indicated in the query command. For example, RFID tag 130a may change the S2 inventoried flag 226 from state A to state B. Similarly, in step 524 RFID tag 130b may backscatter the RF carrier to send a unique identifier, which RFID reader 110 may receive and store. RFID tag 130b may also set the inventoried flag. For example, the S2 inventoried flag 226 may be set to state B.

In step 526, RFID tag 130c may enter the RF field 114. RFID tag 130c may have been unpowered, so the inventoried flags 220 may be in a default state. For example, S2 inventoried flag 226 may be set to state A. RFID tag 130c may have been outside the RF field 114 at the start of the inventory round 420, so RFID tag 130c may not respond during the anticollision phase.

In step 528, RFID tag 130a may experience a tag event. As described above, an event detector 250 may detect some event at RFID tag 130a that causes the event detector 250 to reset an inventoried flag 220. For example, event detector 250 of RFID tag 130a may detect a change in the strength of RF field 114. The event detector 250 may reset the S2 inventoried flag 226 of RFID tag 130a to state A.

In step 530, RFID reader 110 may begin a second inventory round. In particular, RFID reader 110 may query all RFID tags having a selected value for an inventoried flag 220. The selected value for the second inventory round may be the same as the selected value as the first inventory round. By selecting the same value for consecutive inventory rounds, RFID reader 110 may inventory only those tags that have recently entered the RF field 114, those tags that have experienced a tag event, and those tags that have experienced a persistence timeout. For example, if RFID reader 110 queries RFID tags 130 having the S2 inventoried flag 226 set to state A, only RFID tag 130a, which experienced a tag event, and RFID tag 130c, which recently entered the RF field 114, may respond.

In step 532, RFID tag 130a may backscatter the RF carrier to send a unique identifier. RFID reader 110 may receive the unique identifier and compare it with previously received unique identifiers. The unique identifier of step 532 may match the unique identifier of step 422. Accordingly, RFID reader 110 may identify the received unique identifier as a potential tag event to be processed after the anticollision phase.

In step 534, RFID tag 130c may backscatter the RF carrier to send a unique identifier. RFID reader 110 may receive the unique identifier and compare it with previously received unique identifiers. The unique identifier of step 534 may not match any previously received unique identifier because RFID tag 130c recently entered the RF field 114. Accordingly, RFID reader 110 may store the received unique identifier as a new unique identifier.

In step 536, RFID reader 110 may request information from RFID tag 130a, which was identified as having a potential tag event. RFID reader 110 may send a read command to RFID tag 130a to read information stored in memory 260. In step 538, RFID tag 130a may respond to the read command by sending the requested information. RFID reader 110 may use the received information to determine whether RFID tag 130a experienced an authentic tag event. For example, RFID reader 110 may determine whether a tag event indicator was written to memory 260. RFID reader 110 may also obtain further characteristics of the tag event if stored in memory 260.

According to the foregoing, various exemplary embodiments provide for detecting tag events at an RFID tag. In particular, by having a tag reset an inventoried flag when a tag event occurs, a tag reader can determine a tag that experienced a tag event.

It should be apparent from the foregoing description that portions of various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. An integrated circuit (IC) comprising:
an inventoried flag configured to indicate whether the integrated circuit has been inventoried in a current inventory round; and
an event detector configured to detect a tag event at the integrated circuit, the tag event comprising an external event at the location of the tag that is detected by the tag, and reset the inventoried flag based on the tag event.

2. The IC of claim 1, further comprising:
a timer circuit configured to measure a predetermined time since the inventoried flag was set and to prevent the reset of the inventoried flag until the predetermined time has expired.

3. The IC of claim 1, wherein the event detector is a motion detector configured to detect movement of the IC.

4. The IC of claim 1, wherein the event detector is a switch configured to detect a physical contact.

5. The IC of claim 1, wherein the event detector is a temperature sensor configured to detect a change in temperature.

6. The IC of claim 1, further comprising a wired interface configured to receive an indication of an event from an external device, wherein the event detector is configured to reset the inventoried flag based on the received indication.

7. The IC of claim 1, further comprising a memory, wherein the event detector is configured to store data in the memory based on the detected tag event.

8. The IC of claim 1, wherein the IC is an NFC Forum tag.

9. An inventory system comprising:
a tag comprising the IC of claim 1; and
an RFID reader configured to query the inventoried flag of the tag and determine whether a tag event has occurred at the tag.

10. The inventory system of claim 9, wherein the RFID reader is further configured to conduct a first inventory round of any tag having an inventory flag in a first state and conduct a consecutive inventory round of any tag having the inventory flag in the first state.

11. The inventory system of claim 10, wherein the RFID reader is configured to determine that a tag event has occurred at the tag when the tag responds to the first inventory round and the second inventory round.

12. A method performed by a radio frequency identification (RFID) tag, the method comprising:
setting an inventoried flag to indicate that the RFID tag has been inventoried in a current inventory round;
detecting a tag event at the RFID tag, the tag event comprising an external event at the location of the tag that is detected by the tag; and
resetting the inventoried flag in response to detecting the tag event to indicate that the RFID tag has not been inventoried in the current inventory round.

13. The method of claim 12, further comprising:
setting a timer to measure a pre-determined time when the inventoried flag is set;
determining whether a pre-determined time has elapsed since setting the inventoried flag; and
if the pre-determined time has not elapsed, waiting until the pre-determined time has elapsed before resetting the inventoried flag.

14. The method of claim 12, further comprising:
storing information about the tag event in a tag memory; and
transmitting the information to a tag reader when the RFID tag is next inventoried.

15. The method of claim 12, wherein the tag event is one of: a change in a measured temperature, a movement of the tag, and a physical actuation of a switch.

16. The method of claim 12, wherein the tag event is an external event detected via a wired interface with an external device.

17. A method performed by a radio frequency identification (RFID) reader, the method comprising:

conducting a first inventory round of RFID tags within a field of the RFID reader that have an inventoried flag set to a first value;

changing the inventoried flag of tags that respond to a second value;

storing an identifier of each RFID tag that responds to the first inventory round;

conducting a second inventory round of RFID tags within the field of the RFID reader that have an inventoried flag set to the first value;

determining whether an identifier of a tag that responds to the second inventory round was stored for the first inventory round; and if the identifier of a tag that responds to the second inventory round was stored, determining that a tag event has occurred at the RFID tag.

18. The method of claim 17, further comprising receiving information regarding the tag event from the RFID tag.

19. The method of claim 17, wherein the first inventory round and the second inventory round are consecutive.

20. The method of claim 17, further comprising: if the identifier of a tag that responds to the second inventory round was not stored, storing the identifier.

* * * * *